Sept. 12, 1944.  M. A. SIMON  2,358,109
ROTARY ABRADING DEVICE
Filed April 8, 1943

INVENTOR:
MEYER A. SIMON
BY Robert B. Terry
ATTORNEY

Patented Sept. 12, 1944

2,358,109

UNITED STATES PATENT OFFICE 2,358,109

ROTARY ABRADING DEVICE

Meyer A. Simon, Clayton, Mo.

Application April 8, 1943, Serial No. 482,352

17 Claims. (Cl. 29—78)

This invention relates to rotary abrading devices, and more particularly to those types of such devices employing a plurality of individual abrading teeth, utilized in the manner of a rotary rasp.

Devices of the general type noted are widely employed for purposes of abrading non-metallic materials, for example, in the treatment of casings of pneumatic tires incident to recapping or retreading thereof, involving removal of a portion of the original tread for conditioning the surface for the reception of replacement tread stocks to be vulcanized in place. The rotary devices for this purpose are often designated in the trade as tire rasps, and the present improvements relate particularly to the band structure or tack-carrying portions of such devices. Abrading agencies of this type are, however, not restricted to the conditioning of rubber tires for the purpose noted, but are susceptible of wide and general application to various industrial abrading purposes, usually in connection with non-metallic materials.

All of those tack band assemblies heretofore employed for the purposes noted, insofar as within the knowledge of this applicant, are subject to a serious objection in that the nail or tack elements constituting the primary abrading agencies, are frictionally retained in a band of metal, fibre, leather, or other material by which the tack elements are assembled in place on the periphery of a powered pulley or the like. The difficulty arises from the inordinate length of time required for the relatively frequent replacement of dulled, bent or worn nail or tack elements. According to prevailing practice, the worn tacks must be forcibly driven back out of the tack-retaining band, as by hammer blows or by pressure instruments. When this is completed, the replacement tacks, nails or the like must again be driven into place in such manner that they are frictionally secured against displacemnt during rasping operation of the assembly. It will be obvious that the two steps of first driving back and pulling all of the initial worn elements, individually or in small multiples, and the replacement thereof by further driving or impact, results in an extremely high out-of-service time for the machine, and a needless loss of operator time required for tack replacement. The present invention accordingly has as its principal object a material reduction in time and difficulty of tack or nail replacement in a device of the class referred to.

Yet another important object of the invention is attained in an arrangement of elements in a band structure for a rotary rasping device, such that each of the many individual abrading elements is floatingly positioned in a supporting band or like, and such that the teeth are held in protruding position in the band by means other than frictional retention of the shanks of the tacks or the like, whereby, objectively, upon removal of the band from a wheel or the like on which it is mounted, worn tacks or like elements can be made to fall by gravity with little or no manual assistance, from the individual tack seats in the band, thus effecting a considerable saving in time required for tack removal.

A concomitant of the foregoing objective is attained through the same principles of construction, namely, the floating mounting of individual tack elements such that, after the band is cleared, replacement of fresh abrading elements may be carried out but in a small fraction of the time required to drive them in place.

A further important object is attained in a tooth-supporting band for the purpose noted, such that, through the provision of tack or nail receiving depressions, the tacks, for example, are in a measure guided or directed into the openings therefor, merely upon application of the tacks to the band in a general position and location to be inserted.

Still further objects of the invention including improved constructions of mounting band for tacks, nails, spikes or the like in a rotary rasp, such that, for a given weight of metal or other material, there results a more rigid and less easily deformable tack-supporting body; an improved arrangement of individual tack seats and openings in a device of the class described which provides for an improved abrading action of the individual cutting elements such as nails or tacks; an improvement in the manner of supporting tacks or nails in a carrier band, such that an indefinite number of replacements may be made with deleterious effect on the band such as is often experienced in the use of leather elements or the like, through which the tacks are driven according to former practices.

The foregoing and numerous other objects will more readily appear from the following detailed description of a preferred embodiment and certain modifications thereof, particularly when taken in connection with the accompanying drawing, in which.

Figure 4:
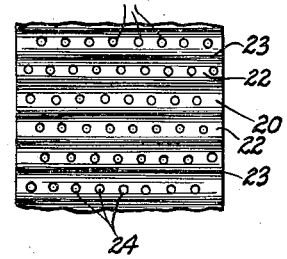
Fig. 4 is a fragmentary plan view of a portion of the preferred form of rasp band, from which the abrading elements have been removed.
Figure 2:
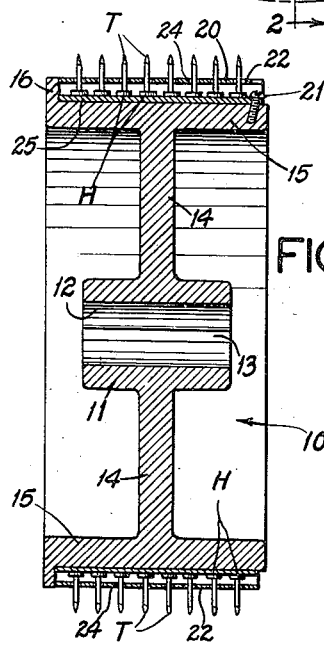
Fig. 2 is a section in a plane including the axis of rotation, as same would appear when viewed along line 2—2 of Fig. 1.

Referring now by characters of reference to the drawing, the band and rasp structure are shown for completeness as mounted peripherally on a pulley or like element 10, provided with a hub 11, a shaft opening 12 and keyway 13; a web 14 serves to connect the hub to the peripheral or face-forming portion 15 of the pulley, the latter being provided with a flange 16 at one margin of the pulley face. The exact form of pulley or other rotary support is not material, and may be in many respects conventional, so long as it provides a sufficient rotatable mounting for the tack-supporting band indicated generally in its preferred form at 20 (Fig. 4). In this form the band 20 is an endless, cylindrical structure of sheet metal, provided with contiguous corrugations, the center spacing of which will somewhat exceed the head diameters of the nails, spikes or tacks T, for reasons hereinafter better appearing. A one-half inch center spacing of corrugations has been used in practice with excellent success, assuming the band 20 to be formed of a moderate gauge metal.

Figure 1:
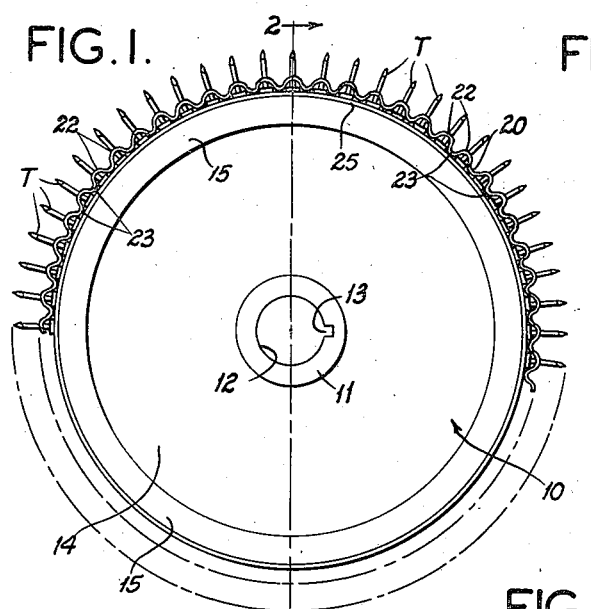
Fig. 1 is a side or face elevation of an assembly including a rotary rasp and supporting pulley therefor adapted for mounting on a powered shaft.

As will appear from Fig. 1, the smallest diameter of the band 20 only slightly exceeds the diameter of the pulley face on portion 15, in fact may be made of approximately the same inside diameter, so that as the band 20 is sleeved over the pulley face it will be very slightly tensioned, this condition being permitted by reason of the corrugated formation of the band. The band, with the individual abrading elements such as tacks T, in place therein as will later appear, is secured to the face portion 15 of the pulley as by a plurality of holding screws 21 (one being shown) threaded into engagement with the portion 15 of the pulley as through suitable tapped recesses. Any suitable holding means may however be provided for retaining the tack-charged band in place on the pulley.

Figure 3:
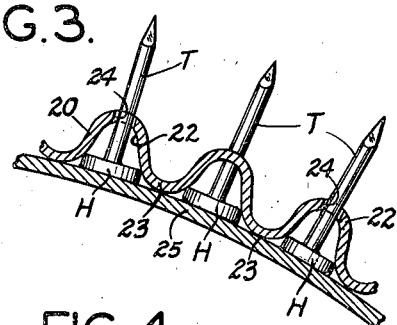
Fig. 3 is an enlarged fragmentary sectional elevation through a portion of the rasp band, showing th relation of certain of the tacks or like abrading elements to the band.

Proceeding now to a more detailed description of the tack-supporting facilities and function of the band 20, it will be seen, particularly from Fig. 3, that the corrugations of the band include what may be considered as valleys 22 and peaks 23 and that, as before mentioned, the spacing between the peaks is such that each of the heads H of the tacks T will be seated in one of the valleys in such manner that the head portion lies approximately flush with the peaks 23; each corrugation thus, in effect, provides a row of individual tack seats. Each of the tack seats identified with the upper portions of the valleys 22 is further identified as to location by an individual tack opening 24. It is important in the practice of the present invention that the tack openings 24 be made appreciably larger than the largest adjacent shank portion of the tack or nail to extend therethrough. This relation will readily appear from Fig. 3, which shows the several shank portions of the tacks free of any frictional retaining engagement with the margins of the openings 24. Thus while the band 20 serves as a locator and lateral retainer for the individual abrading teeth, it does not, of itself, serve to keep them in protruding, operative abrading positions. This latter function is cared for solely by the bearing of the several heads H of the tacks T against the subjacent cylindrical surface, such as the face of pulley 15 or if desired, of an optional band element 25. In the event the latter is utilized, the band 25 is a convenience in translating the tack-charged band 20 to an operative assembly position on the face-forming element 15 of the pulley. It may, if desired, be left in place, or may be used merely as a temporary holder to prevent retraction of the tacks. With most types of tacks or other tooth elements, it is preferable to retain the collar or ring 25 in place adjacent the band 20, so that it remains in position between band 20 and the pulley face. The ring 20 is of tempered material, formed to provide a bias in an outward direction, serving thus to wedge the heads of the elements T tightly onto their respective seats. Experience has shown that this wedging effect results in an elimination of any tendency of the tacks or teeth to rock or "wobble" in the tack band, even when heavily loaded during the rasping operation.

The pattern of tack seats and tack-receiving openings 24 on the band 20 is susceptible of numerous variations, but it has been found conducive to best results, particularly in tire abrading work, to stagger somewhat the adjacent rows of tacks, each considered as having a trend along the axis of the pulley. A highly satisfactory arrangement is suggested by Fig. 4, wherein it will appear that the tack openings 24 and hence the corresponding head seats of an adjacent row, are endwise offset with respect to each other, and further by choice, that the individual openings of the intervening rows are not exactly in line. There thus results a somewhat bias arrangement of rows formed in a peripheral direction about the band, and hence about the wheel or pulley. The described staggered and offset relation of tack openings and hence of tacks when in operative position, serves to prevent any tendency to grooving the material being abraded and results in a more even removal of material over the surface under treatment.

Figure 5:
Fig. 5 is a fragmentary view of a somewhat modified form of the invention, being a partial section in an axial plane.
Figure 6:
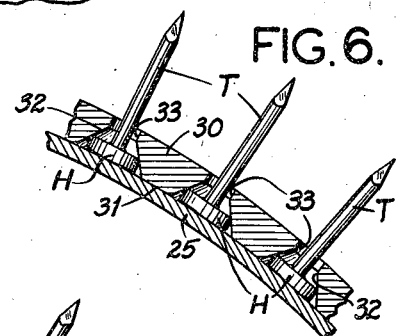
Fig. 6 is a view similar to Fig. 3, but illustrating the modification shown by Fig. 5.

Substantially the same principles of the present improvements as characterize the band 20, are found in the minor modification of Fig. 5, wherein the band 30 consists of a considerably heavier gauge material, preferably a metal. From one, for example the inner surface 31, is formed a series of individual tack seats as by the several countersunk or counterbored portions 32. As will readily appear from Fig. 6 for example, the counterbored seats 32 lead into the individual tack-shank-receiving openings 33, each significantly appreciably larger in diameter or other sectional area than the adjacent shank portion of the spike or tack T extending therethrough. As in the principal construction, the diameter and form of the countersunk seats 32 are chosen preferably in accordance with the diameter of the heads of the tacks or the like, such that the heads in operative position lie flush with the surface 31 of the band 30. In the modification of Figs. 5 and 6 the seats 32 are tapered in diameter, converging from the surface 31 to a minimum diameter at the entrance of the adjacent tack openings 33.

Figure 8:
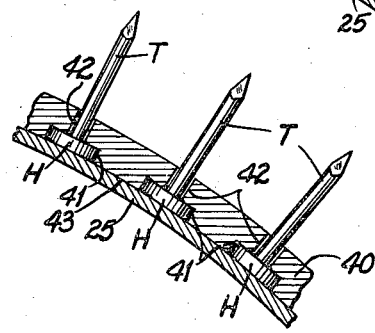
Fig. 8 is an enlarged fragmentary section of the modification of Fig. 7, being similar in scope and purpose to the showings of Figs. 3 and 6.
Figure 7:
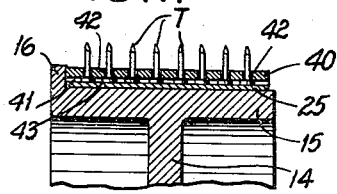
Fig. 7 is a view similar to Fig. 5, and consisting of a fragmentary section, in an axial plane, of an assembly of still further modified form.

A somewhat further modified form of structure is shown by Figs. 7 and 8, wherein a band 40 is channeled, each channel for example as indicated at 41, extending parallel to the axis of rotation, and from one margin of the band through to the other. The band 40 is accordingly of substantial gauge corresponding for example, to that of the band 30 heretofore described, and each of the channels 41 opens into a row of tack openings 42, these latter, as will appear from Fig. 8, being appreciably larger than the adjacent portion of the tack which extends therethrough. Also, the depth of the channels 41 is preferably such as to correspond approximately to the thickness of tack head H so that the heads lie flush with the surface 43 of the band 40.

It will be understood as optional to utilize or not, the band 25 with each of the several modified forms of tack-supporting band. If the band 25 be dispensed with in assembly, the inner surface of band 30 or of band 40 will bear directly against the pulley face of portion 15. In either event, it will appear that the band 25 or the portion 15 acts independently of the tack-holding band for causing the abrading elements to protrude beyond the band into rasping position.

As to the function of the channels 41 of the last-described modification, it will appear that these serve substantially the same tack-holding function, and similarly serve, each to provide a row of individual tack-supporting seats, as is the case in the principal construction, specifically the channels therein constituted by the adjacent tack-receiving corrugations.

The manner of usage of the assembled tacks, tack band and pulley structure will now have become fully apparent and require no detail of description. The rotary abrading structure, suitably powered as by a shaft extending through the hub, serves in a manner now readily apparent, to bring the tack elements into abrading relation to the desired article, surface or material.

As to the manner first of removal of worn or bent abrading elements from the supporting band and the manner of substitution of new or unworn abrading elements, attention is directed to an accompanying application filed concurrently herewith by this applicant and covering a preferred arrangement and agency for clearing the band and again recharging same with fresh abrading elements. The accompanying application is of even filing date herewith, and designated as Serial No. 482,353, entitled Loading devices for rotary rasps.

There cannot be overemphasized, the time-saving advantage of the several forms of tack-seats, such as the corrugations including valleys 22, the tapered recesses 32 or channels 41. If a handful of tacks, for example, be dropped over a given zone of the band, many thereof will, by gravity, under a very slight shaking movement of the band, find their way into the seats. Repetition of this mode of loading the band will, in a few minutes time, result in filling the band, due largely to the guiding function of the channels and recesses. Loading of the band is particularly facilitated by use of the device therefor as described and claimed in my copending application, to which attention is directed.

It will have appeared that the present arrangement and improvements, largely by reason of the floating and guided relation of the tacks in and to the tack band, will enable the band to be cleared of the old tacks in but a few moments time and will similarly facilitate recharging thereof with new tacks or similar elements, all in full attainment of the several objects above specifically set forth, and others implied from the description.

Although the invention has been described by making specific reference to but a few of the many practical emboiments, the detail of description is to be understood in an instructive and not in a limiting sense, many changes being possible within the scope and full intendment of the claims hereunto appended.

I claim as my invention:

1. In a rotary abrading device, an endless band provided with a plurality of apertures, a plurality of headed abrading elements extended through the apertures in the band and floatingly positioned therein, the band being formed on one of its surfaces with head-centering depressions to receive the heads of the abrading elements, and means tending closely to engage one surface of the band and coacting therewith for maintaining the abrading elements in position to project through and beyond the band.

2. In a rotary abrading device, an endless band provided with a plurality of apertures, a plurality of abrading elements extended through the apertures in the band and substantially free of frictional engagement with the apertured portions of the band, each of said elements being characterized by an apexed end and an opposite headed end, the band being provided with head-centering and receiving formations, and means internally of the band coacting therewith for maintaining the headed ends of the elements in position in said formations, and with the apexed ends of the elements projecting through and beyond the band for abrading purposes.

3. A band structure for a rotary rasping device including an endless band provided with a number of perforations each adapted to receive a spike element, a plurality of headed spike elements extended through the perforations all with their headed ends on one side of the band, the band being formed to provide a spike-locating and guiding seat about each of the perforations, each such seat coacting, upon insertion of the spikes, to direct the spike into the adjacent perforation, and means for retaining the spikes in position in the perforations.

4. In a band structure for a rotary rasping device, a band closed upon itself and provided with a number of perforations adapted to receive rasp nails, a plurality of headed rasp nails extending through the perforations and having their headed ends on one side of the band, the band being formed to provide, for each of the nails, a seat depressed from the head engaging surface of the band and adjacent each of the perforations, and means operative in assembly to prevent retractive movement of the nails in the perforations.

5. In a rotary tooth-type band assembly for the general purpose noted, an apertured band, a plurality of headed tooth elements adapted to extend through the apertures of the band, and tooth-directing and tooth-head-centering surfaces formed on the band, tending to guide the 6. In a rotary rasp band assembly for the general purpose noted, an apertured band, a plurality of tack elements adapted to extend through the apertures of the band, and a plurality of converging recesses formed in the regions of the apertured portions of the band, tending to guide the tack elements into the apertures upon application of the tack elements to the recessed portion of the band.

7. In a band structure for a rotary rasping device, an endless band provided with a number of perforations, a rasp nail extended through each of said perforations, the rasp nails extending in corresponding directions, and so being similarly presented on the band, the band being recessed in the immediate zone of each perforation whereby to provide a nail-locating and directing portion adjacent each nail opening, and means coacting with the band for keeping the nails in fixed operative relation to the band.

8. In a band structure for a rotary rasping device, an endless band provided with a number of perforations each adapted to receive an apexed rasping element, a plurality of such elements each provided with a head, the band being formed to provide seats for said heads, countersunk below the curved plane of one side of the band, and means other than the band for keeping the apexed elements in extended, abrading position in the band.

9. In a band structure for a rotary abrading device, an endless band provided with a number of relatively small openings therethrough, each adapted to receive a nail element loosely extended therethrough, a plurality of seats for the headed ends of the nail elements, said seats being formed in one of the curved surfaces of the band, and shaped to receive and align said headed ends, the openings and seats being arranged in rows on the band, each of said rows extending substantially along the axis of actuation of the band and the openings and seats of adjacent rows being offset with respect to those of the intervening rows.

10. In a rotary rasping device, a band provided with a number of perforations each adapted to receive a rasp nail, the nails and the openings in the band being so proportioned that the nails extend through the openings in substantially frictionless or floating relation, the band being recessed from one surface, in the regions of the nail openings to provide seats for accommodating and centering the heads of the nails, and the seats being arranged in rows along the axis of the band with the seats and openings of successive rows being relatively axially displaced in a manner to result in a bias arrangement of seats and openings, proceeding peripherally of the band.

11. In a band structure for a rotary tack rasp, an endless band provided with individually formed tack head seats and tack apertures extending through each of said seats, the tack seats being depressed from the curved inner surface defined by the band, and shaped to engage opposite margins of the tack heads whereby to align the tacks in the apertures, and the apertures being so proportioned with respect to the tacks that each aperture receives a shank portion of a tack in floating relation, and separate means coacting with the band for keeping the tack heads in firm engagement with the inner surface of the band.

12. In a rotary rasping device, a substantially cylindrical band provided with a number of apertures for the insertion of rasping tacks therethrough, the band being formed to provide a plurality of concavely dished individual seats in the vicinity of the tack apertures, so arranged as to tend to guide the tacks into said apertures in assembly, the tacks being of a size such that their shank portions float in the apertures, and means bearing against the heads of the tacks in assembly for keeping them urged outwardly and extended through the apertures.

13. A tack rasp band including a band element formed to provide a plurality of elongate channelled seats for tacks or the like, and provided with a plurality of tack openings in said seats, the channels constituting the seats, and the openings, being located in lines or rows each at a substantial angle to a plane normal to the axis of actuation of the tack band.

14. The combination and arrangement of elements and features of structure substantially as recited in claim 13, but further characterized in that the tacks are supported in floating relation in the apertured portions of the band, and means coacting with the band to maintain the tacks in positions to project beyond the apertures of the band.

15. A band for a tack rasp or similar abrading device, consisting of a substantially cylindrical element of corrugated metal and provided with a plurality of rows of tack-receiving apertures, the rows of apertures paralleling the corrugations of the band.

16. As an article of manufacture, a band for a rotary abrading device utilizing headed nail-like elements as the abrading agencies, the band being formed of a substantially cylindrical element of corrugated metal, and provided with a number of apertures for the reception of the nail-like elements, the apertures being arranged in rows substantially in the valleys of the corrugations as viewed from the nail-head-engaging surface of the band.

17. A tack holder assembly adapted for rotary mounting and actuation as a tack rasp, including a circular metal element provided with a number of tack head seats on one of its surfaces, and with tack apertures extending through the seat-forming portions of the metal element, the tack seats being depressed from that surface of the circular element which is nearest the head portions of the tacks, and shaped substantially to contain the tack heads and to engage opposite margins thereof, whereby to direct the tacks into and tend to align them in the apertures, and the apertures being so proportioned with respect to the shank portions of the tacks as to receive the tack shank portions in floating relation therein, and separate means coacting with the metal element for keeping the tack heads in firm engagement with the said head seats.

MEYER A. SIMON.